May 28, 1935.  E. J. HADLEY  2,002,854
SELECTIVE TRANSMISSION FOR MOTION PICTURE AND SOUND PROJECTORS
Filed Jan. 22, 1932
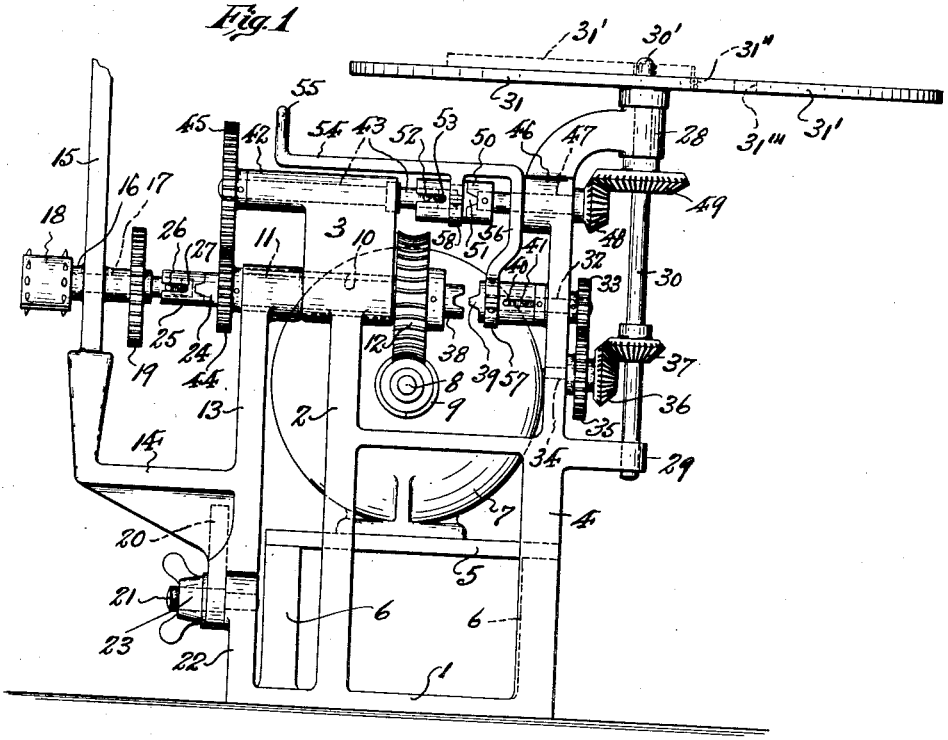
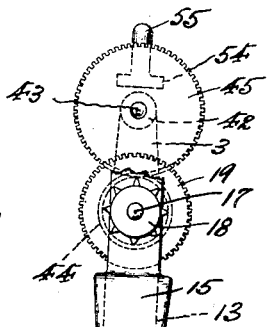
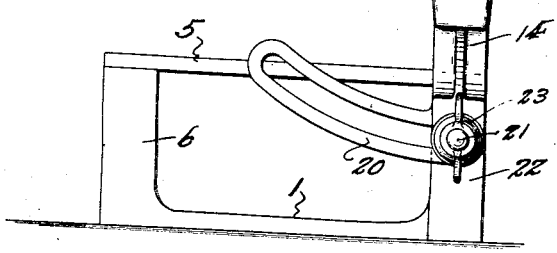
INVENTOR
Edwin J. Hadley,
BY George D. Richards
ATTORNEY Patented May 28, 1935

2,002,854

UNITED STATES PATENT OFFICE 2,002,854

SELECTIVE TRANSMISSION FOR MOTION PICTURE AND SOUND PROJECTORS

Edwin J. Hadley, Brooklyn, N. Y.

Application January 22, 1932, Serial No. 588,059

2 Claims. (Cl. 88—16.2)

This invention relates to improvements in motion picture projectors having associated phonograph means for the production of sound to accompany picture exhibition; and the invention has reference, more particularly, to an improved selective transmission means for synchronizing the operation and sound emission of a phonograph record in company with a corresponding picture projection; said transmission means being so arranged that it may be manipulated to permit of independent operation of either the phonograph means or the picture projector at will.

This invention has for its principal object to provide an associated motion picture projector and disc phonograph mechanism adapted to be operated from a single power source, and having selective transmission means adapted to operate the projector and phonograph means in synchronized relation, wherein the speed of phonograph disc rotation is in accord with the requirements for the operation of discs having sound records corresponding to a given motion picture and adapted to synchronize with the picture film, when said film is running at the normal projecting speed, usually at the rate of 1440 picture units per minute; said selective transmission means being operable to permit, at will, direct drive of the phonograph means at another speed in accord with the requirements for operation of ordinary disc records, whereby musical or sound entertainment without picture projection or to accompany silent pictures may be produced.

This invention has for a further object to provide an associated motion picture projector and disc phonograph mechanism, means for angularly adjusting the projector mechanism without disturbing the synchronized operation of the phonograph means or the necessary horizontal position or level of its turn-table, whereby registering of the projected pictures upon the exhibition screen may be easily attained.

Another object of this invention is to provide a compact mechanism including a foldable phonograph disc turn-table, whereby the mechanism may be stored in a minimum space, and therefore requires but a comparatively small carrier or storage case.

Other objects of this invention, not at this time more particularly enumerated, will be understood from the following detailed description of the same.

An illustrative embodiment of this invention is shown in the accompanying drawing, in which:—

Fig. 1 shows an end elevation in part of an associated motion picture projector and disc phonograph turn table together with the novel selective transmission means therefor according to this invention; and Fig. 2 is a fragmentary side elevation showing the means for angularly adjusting the projector mechanism.

Similar characters of reference are shown in the above described views, to indicate corresponding parts.

Referring to the drawing, the reference character 1 indicates the base of the frame-work upon which the working parts of the mechanisms are mounted; said frame-work including an upright member or standard 2 having a main bearing head 3, and further including a second upright member or standard 4, which is laterally spaced from but aligned with said first mentioned upright member or standard 2. Said frame-work is further provided with a motor shelf 5 supported above said base 1 by suitably arranged leg members 6. Fixed upon said motor shelf 5 is an electric motor 7, on the drive shaft 8 of which is fixed a drive worm 9.

Journaled in a bearing opening 10 provided in said head 3 is an auxiliary drive shaft 11 upon which is fixed a worm gear 12 which meshes with and is driven by said drive worm 9, to in turn drive the shaft 11.

Pivotally mounted on said shaft 11 to extend downwardly therefrom is a bracket member 13, which is provided with an outwardly extending offset portion 14. Connected with said offset portion 14, so as to be carried thereby in upward extension therefrom, is the carrier plate 15 of a motion picture projector mechanism. Said carrier plate 15 is provided with a bearing 16, which is axially aligned with the shaft 11. Journaled in said bearing 16 is a projector shaft 17, upon the outer end of which is fixed a film driving sprocket 18, which engages the perforate margins of a film so as to impart motion to the latter, whereby the same is operatively moved past the aperture of the illuminating means (not shown) which is carried at the upper end of the carrier plate 15, said upper end being broken away in the accompanying drawing. Said carrier plate 15 also supports the film timing means (not shown), but which is usually disposed between the illuminating means and the driving sprocket 18, such timing means being driven from the gear 19 which is fixed on the inner end of said projector shaft 17. The mechanism thus constituting the motion picture projector means of the machine being preferably of the general type and kind shown in my United States Patent No. 1,334,450, dated March 23, 1920. Connected with the lower end of said bracket member 13 is an arcuate slotted arm or quadrant 20 which is engaged by a threaded stud 21 arranged to project therethrough from a post 22 connected with the base 1 of the frame-work. Threaded on the projecting free end of said stud 21 is a winged lock nut 23. The bracket member 13 may be angularly adjusted by swinging the same about the axis of the shaft 11, and fixed in desired adjusted position by tightening the lock nut 23 which clamps the slotted arm or quadrant 20 to the post 22. By this arrangement the angle of picture projection may be easily and quickly adjusted to register the pictures on the exhibition screen, without in any way disturbing the operative relations of the power transmission mechanism hereinafter described or without disturbing the normal operating level of the phonograph turn-table.

Fixed on the outer end of the auxiliary drive shaft 11 is a clutch member 24, which, as shown, is the male member of a clutch means for connecting and disconnecting at will the projector shaft 17 with and from the shaft 11. Axially movable on the inner end of said projector shaft 17 as opposed to and aligned with said shaft 11, is a clutch member 25, connected with said projector shaft 17 by a cooperating pin 26 and slot 27, whereby said clutch member 25 is axially movable on but not rotatable relative to the projector shaft. The clutch member 25, as shown, is the female member of the clutch means. It will be obvious, that by sliding the female clutch member 25 forwardly on the projector shaft 17 it may be brought into clutched engagement with the clutch member 24, thereby connecting the projector shaft 17 in driven relation to the auxiliary drive shaft 11, so as to cause operation of the motion picture projector mechanism. It will be understood that I do not necessarily limit myself to the specific form of clutch means shown in the drawing and hereinabove described, since any suitable clutch mechanism may be employed.

Connected with the upright member or standard 4 are outwardly offset vertically aligned bearing members 28 and 29, in which is journaled the vertical shaft 30 of a phonograph turn-table 31, which is fixed to the upper end of the shaft 30 above the upper bearing member 28. A normal or high speed transmission means is provided for actuating the phonograph turn-table from the motor 7, the same comprising a transmission shaft 32 journaled in and through said upright member or standard 4 so as to be disposed in alignment with the auxiliary drive shaft 11. Fixed on the outer end of said transmission shaft 32 is a gear 33. Rotatable on a journaled stud 34 affixed to and projecting outwardly from said upright member or standard 4 is a gear 35 which meshes with and is driven by said gear 33. Affixed to said gear 35 so as to rotate therewith is a bevel gear 36 which meshes with and drives a bevel gear 37 secured to said turn-table shaft 30. Fixed on the inner end of said auxiliary drive shaft 11 is a clutch member 38, which, as shown, is the female member of a clutch means for connecting and disconnecting at will the transmission shaft 32 with and from the shaft 11. Axially movable on the inner end of said transmission shaft 32 is a clutch member 39, which is connected with said transmission shaft by a cooperating pin 40 and slot 41, whereby said clutch member 39 is axially movable on but not rotatable relative to said transmission shaft. The clutch member 39, as shown is the male member of the clutch means, and may be moved into clutched or released relation to the clutch member 38 of said auxiliary drive shaft 11.

A synchronizing or slow speed transmission means is also provided for selectively actuating the phonograph turn-table from the motor 7 at a speed to accord with requirements for operation of phonograph disc records prepared with sound recording to accompany and correspond to given motion picture films. This synchronizing or slow speed transmission comprises the following elements. Journaled in a bearing extension 42, with which the bearing head 3 of the upright member or standard 2 is provided, is a counter-shaft 43. Fixed on the outer end portion of said auxiliary drive shaft 11 is a gear 44 which meshes with and drives a gear 45 fixed on the outer end of said counter-shaft 43. Journaled in and through a bearing member 46 connected with said second upright member or standard 4 is a second transmission shaft 47. Fixed on the outer end of said transmission shaft 47 is a bevel gear 48 which meshes with and drives a bevel gear 49 secured to said turn-table shaft 30. Fixed on the inner end of said transmission shaft 47 is a clutch member 50, which, as shown, is the female member of a clutch means for connecting and disconnecting the transmission shaft 47 with and from said counter-shaft 43. Axially movable on the inner end of said counter-shaft 43 is a clutch member 51, which is connected with said counter-shaft by a cooperating pin 52 and slot 53, whereby said clutch member 51 is axially movable on but not rotatable relative to said counter-shaft. The clutch member 51, as shown, is the male member of the clutch means, and may be moved into clutched or released relation to the clutch member 50 of said second transmission shaft.

A clutch shift means cooperative with the clutch devices 38—39 and 50—51 is provided, the same being so arranged that it will function on one movement to disconnect the clutch devices 38—39 of the high speed transmission means while connecting the clutch devices 50—51 of the slow speed transmission means and vice versa. This shift means, in one illustrative form, comprises a shift-bar 54 having a finger piece 55 for manipulating the same. Connected with said shift-bar 54 is a leg 56 having a yoke or slip-ring portion 57 to engage in and around an annular external channel provided in the movable clutch member 39 of the clutch set 38—39. Connected with said shift bar 54 is a second yoke or slip-ring portion 58 to engage in and around an annular external channel provided in the movable clutch member 51 of the clutch set 50—51. Variations in the specific form of clutch shift mechanism are possible, and consequently the arrangement thereof as described is to be deemed merely illustrative.

In the use of the associated motion picture projector and phonograph means, it will be understood that any suitable phonograph reproducer mechanism will be provided for cooperation with a record disc mounted upon and rotated by the turn-table 31, although a showing of such reproducer mechanism is omitted in the accompanying drawing.

It is the general practice, in motion picture projectors of the kind here involved, to run the film at the rate of 1440 pictures per minute, and since the sprocket 18 moves 8 pictures during each revolution thereof, this sprocket 18 is normally driven at a speed of 180 R. P. M. It is also general practice to produce phonographic disc records of appropriate sound to accompany a given picture subject, which records are so recorded that the sound out put thereof will synchronize with the picture film, when the latter runs at the normal speed of 1440 pictures per minute, upon rotation of the record disc at the relatively slow speed rate of 33⅓ R. P. M. Ordinary phonograph disc records give best results when operated at a speed of approximately 80 R. P. M. Having these facts in mind, it will be obvious that there is an advantage in providing a selective phonograph turn-table transmission means, whereby the same may be optionally actuated at the relative slow speed of 33⅓ R. P. M. or at the normal high speed of 80 R. P. M. or thereabouts, according to the desire of the machine user to exhibit synchronized sound accompanied pictures, or the so called silent pictures, with or without uncorrelated sound accompaniments such as music, or to produce musical or other sound entertainment from ordinary phonograph records while the motion picture projector is idle, as e. g. when changing a film in connection therewith. The present invention will permit of the optional operation of the phonograph turn-table 31 according to any of the above specified conditions, and to this end the high speed transmission mechanism operating through transmission shaft 32 and gears 33—35—36—37 is designed to be driven from the auxiliary drive shaft 11 which rotates at 180 R. P. M. at a speed reduction adapted to drive the turn-table shaft 30 and turn-table at approximately 80 R. P. M. The low speed transmission mechanism operating through the reduction gearing 44—45, counter-shaft 43, second transmission shaft 47 and gearing 48—49 is designed to be driven from said auxiliary drive shaft 11 rotating at 180 R. P. M. at a speed reduction calculated to drive the turn-table shaft 30 and turn-table at 33⅓ R. P. M. By reason of the shift mechanism which simultaneously actuates the clutch sets controlling the respective high and low speed transmission, to release the one when the other is engaged, it will be seen that the operator can easily and quickly selectively attain at his option the operation of the phonograph turn-table at a speed appropriate to the particular type of record disc employed.

Since many motion picture projectors with associated phonograph mechanism are made in a portable form, it is desirable to render the mechanism of compact form, particularly when arranged to be enclosed in a portable carrying case. To this end, I have provided the phonograph turn-table in a novel foldable form, whereby a portion as 31′ thereof is hingedly connected to the main body 31, by a hinge means 31″, and so as to be capable of being folded over and upon said main body 31; said foldable portion 31′ having a properly disposed perforation 31‴ in its body to engage over the center stud 30′ of the turn-table when folded over the latter, as indicated by dotted lines in Fig. 1 of the drawing.

Various changes, other than those already referred to, could be made in the above described construction, and many apparently widely different embodiments of this invention could be made without departing from the scope thereof, consequently it is intended that all matter contained in the above description or shown in the accompanying drawing shall be interpreted as illustrative, and not in a limiting sense.

I claim:—

1. In an associated motion picture projector and phonograph mechanism, a motor actuated drive shaft, a bracket member angularly adjustable about the axis of said drive shaft, a carrier plate for projector mechanism connected with said bracket member, a projector shaft journaled in said carrier plate in alignment with said drive shaft and adapted to be driven by the latter, a phonograph turn-table, a vertical turn-table shaft carrying said turn-table, said turn-table shaft having a pair of bevel gears thereon, a transmission means connected to one of said bevel gears for driving said turn-table at one speed, a second transmission means connected to the other of said bevel gears for driving said turn-table at another speed, each transmission means having a clutch means for engaging the same in driven relation to said drive shaft, and a clutch shift mechanism common to each clutch means and operative to release one clutch means when engaging the other.

2. In an associated motion picture projector and phonograph mechanism, a motor actuated drive shaft, a bracket member angularly adjustable about the axis of said drive shaft, means to lock said bracket member in selected adjusted position, a carrier plate for projector mechanism supported by said bracket member, a projector shaft journaled in said carrier plate in alignment with said drive shaft, a releasable clutch for engaging said projector shaft in driven relation to said drive shaft, a phonograph turn-table, a vertical turn-table shaft carrying said turn-table, said turn-table shaft having a pair of bevel gears thereon, a transmission means connected at one end to one of said bevel gears for driving said turn-table at one speed, a second transmission means connected at one end to the other of said bevel gears for driving said turn-table at another speed, said first named transmission means being connected at its other end to one end of said drive shaft and said second named transmission means being connected at its other end to the second end of said drive shaft each transmission means having a clutch means for engaging the same in driven relation to said drive shaft, and a clutch shift mechanism common to each clutch means and operative to release one clutch means when engaging the other.

EDWIN J. HADLEY.